US012208626B2

(12) United States Patent
Ito et al.

(10) Patent No.: US 12,208,626 B2
(45) Date of Patent: Jan. 28, 2025

(54) THERMAL TRANSFER PRINTER, METHOD FOR PRODUCING PRINTED PRODUCT, PRINTED PRODUCT, COMBINATION OF THERMAL TRANSFER SHEET AND INTERMEDIATE TRANSFER MEDIUM, INTERMEDIATE TRANSFER MEDIUM, AND THERMAL TRANSFER SHEET

(71) Applicant: Dai Nippon Printing Co., Ltd., Tokyo (JP)

(72) Inventors: Takashi Ito, Tokyo (JP); Yuzu Imakura, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 546 days.

(21) Appl. No.: 17/593,153

(22) PCT Filed: Apr. 28, 2020

(86) PCT No.: PCT/JP2020/018112

§ 371 (c)(1),
(2) Date: Sep. 10, 2021

(87) PCT Pub. No.: WO2020/241159

PCT Pub. Date: Dec. 3, 2020

(65) Prior Publication Data

US 2022/0184971 A1 Jun. 16, 2022

(30) Foreign Application Priority Data

May 31, 2019 (JP) ................................ 2019-102841

(51) Int. Cl.
*B41J 2/325* (2006.01)
*B41J 2/335* (2006.01)
(Continued)

(52) U.S. Cl.
CPC ............. *B41J 2/325* (2013.01); *B41J 2/3353* (2013.01); *B41M 5/345* (2013.01); *B41M 5/38235* (2013.01); *B41M 2205/38* (2013.01)

(58) Field of Classification Search
CPC .......... B41J 2/325; B41J 2/3353; B41J 2/315; B41M 5/345; B41M 5/38235;
(Continued)

(56) References Cited

U.S. PATENT DOCUMENTS 6,709,542 B1 3/2004 Naito et al.
2018/0345705 A1* 12/2018 Lien ........................ B41J 2/475

FOREIGN PATENT DOCUMENTS

JP 2000-043434 A 2/2000
JP 2001-096922 A 4/2001
(Continued)

OTHER PUBLICATIONS

Extended European Search Report (Application No. 20814582.1) dated Jan. 13, 2023.
(Continued)

*Primary Examiner* — Kristal Feggins
(74) *Attorney, Agent, or Firm* — BURR PATENT LAW, PLLC

(57) ABSTRACT

A thermal transfer printer includes a first supply unit configured to supply an intermediate transfer medium in which, on one surface of a first base, a transfer layer including a receiving layer is disposed, a second supply unit configured to supply a thermal transfer sheet in which, on one of surfaces of a second base, a colorant layer and a particle layer are disposed, a printing unit configured to heat the thermal transfer sheet, to transfer a colorant from the colorant layer to the receiving layer to form an image, and to transfer the particle layer onto the receiving layer, a third supply unit configured to supply a transfer-receiving body,
(Continued)

and a transfer unit configured to place the intermediate transfer medium and the transfer-receiving body on top of each other such that the transfer-receiving body faces the particle layer on the receiving layer, and to heat the intermediate transfer medium.

4 Claims, 4 Drawing Sheets

(51) Int. Cl.

| | |
|---|---|
| ***B41M 5/34*** | (2006.01) |
| ***B41M 5/382*** | (2006.01) |

(58) Field of Classification Search

CPC .......... B41M 2205/38; B41M 5/38207; B41M 5/40; B41M 5/42; B44C 1/1725; B44C 1/17; B41F 16/0033; B41F 16/0026; B41F 16/0006; B41F 16/00

See application file for complete search history.

(56) References Cited

FOREIGN PATENT DOCUMENTS

| | | | |
|---|---|---|---|
| JP | 2001-287390 | A | 10/2001 |
| JP | 2003-025733 | A | 1/2003 |
| JP | 2003-291505 | A | 10/2003 |
| JP | 2010-005885 | A | 1/2010 |
| JP | 2015-150870 | A | 8/2015 |
| JP | 2017-154435 | A | 9/2017 |

OTHER PUBLICATIONS

AN Korean Office Action (Application No. 10-2021-7028198) dated Jun. 23, 2023 (with English translation) (8 pages).

International Search Report and Written Opinion (Application No. PCT/JP2020/018112) dated Aug. 11, 2020.

Japanese Office Action (Application No. 2020-566006) dated Jan. 19, 2021.

Japanese Office Action (Application No. 2020-566006) dated Apr. 27, 2021.

* cited by examiner

THERMAL TRANSFER PRINTER, METHOD FOR PRODUCING PRINTED PRODUCT, PRINTED PRODUCT, COMBINATION OF THERMAL TRANSFER SHEET AND INTERMEDIATE TRANSFER MEDIUM, INTERMEDIATE TRANSFER MEDIUM, AND THERMAL TRANSFER SHEET

TECHNICAL FIELD

The present invention relates to a thermal transfer printer, a method for producing a printed product, a printed product, a combination of a thermal transfer sheet and an intermediate transfer medium, an intermediate transfer medium, and a thermal transfer sheet.

BACKGROUND ART

As one of methods for forming a thermal transfer image on a desired object, there is a known method of using an intermediate transfer medium in which a receiving layer is disposed on a base so as to be releasable. In this method, first, a thermal transfer sheet having a coloring material layer is used to form a thermal transfer image on the receiving layer of an intermediate transfer medium. Subsequently, the transfer layer including the receiving layer is transferred onto a transfer-receiving body. This method is used to form an image on a card base, to produce an ID card or a credit card, for example.

In some existing cases where the transfer layer of an intermediate transfer medium is released from the base and transferred onto a transfer-receiving body, a burr referred to as tailing is generated, resulting in lowering of foil transfer precision. In particular, in order to provide high durability, in the case of introducing a sturdy layer such as a cured layer into the transfer layer, the foil transfer precision tends to lower.

Patent Literature 1: JP2017-154435A

SUMMARY OF INVENTION

An object of the present invention is to provide a thermal transfer printer that enables transfer of a transfer layer with high foil-separating property, a printed product, and a method for producing a combination of a thermal transfer sheet and an intermediate transfer medium. Another object of the present invention is to provide a printed product in which a transfer layer has been transferred with high foil-separating property.

According to the present invention, a thermal transfer printer includes a first supply unit configured to supply an intermediate transfer medium in which, on one of surfaces of a first base, a transfer layer including a receiving layer is disposed, a second supply unit configured to supply a thermal transfer sheet in which, on one of surfaces of a second base, a colorant layer and a particle layer are disposed, a printing unit configured to heat the thermal transfer sheet, to transfer a colorant from the colorant layer to the receiving layer to form an image, and to transfer the particle layer onto the receiving layer, a third supply unit configured to supply a transfer-receiving body, and a transfer unit configured to place the intermediate transfer medium and the transfer-receiving body on top of each other such that the transfer-receiving body faces the particle layer on the receiving layer, and to heat the intermediate transfer medium to transfer the transfer layer onto the transfer-receiving body such that the particle layer is placed in at least a portion of a peripheral area of the transfer-receiving body, to produce a printed product.

ADVANTAGEOUS EFFECTS OF INVENTION

The present invention enables transfer of a transfer layer with high foil-separating property.

DESCRIPTION OF EMBODIMENTS

Hereinafter, embodiments will be described with reference to drawings.

Figure 1:
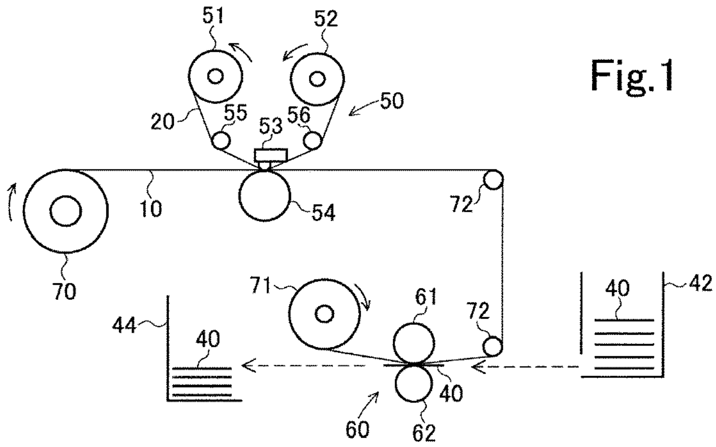
FIG. 1 is a schematic configuration view of a thermal transfer printer according to an embodiment of the present invention.

FIG. 1 is a schematic configuration view of a thermal transfer printer according to an embodiment of the present invention. As illustrated in FIG. 1, the thermal transfer printer includes a printing unit 50 that uses a thermal transfer sheet 20 to print an image on a receiving layer 13 disposed on an intermediate transfer medium 10 (refer to FIG. 2) and to transfer, onto the receiving layer 13, a particle layer 27 (refer to FIG. 3 and FIG. 4); a transfer unit 60 that transfers a transfer layer 14 onto a transfer-receiving body 40; and a control unit (not shown) that controls the units.

Intermediate Transfer Medium

Figure 2:
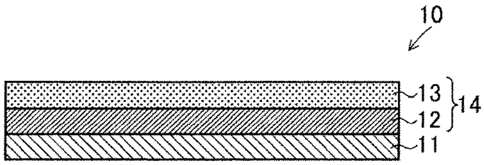
FIG. 2 is a sectional view of an intermediate transfer medium.

First, the intermediate transfer medium 10 used in the thermal transfer printer will be described. FIG. 2 is a sectional view of the intermediate transfer medium 10. The intermediate transfer medium 10 includes a base 11 and a transfer layer 14 disposed on one of surfaces of the base 11. The transfer layer 14 has a multilayer configuration having a protective layer 12 disposed on the base 11, and a receiving layer 13 disposed on the protective layer 12. The receiving layer 13 is positioned in the uppermost surface of the intermediate transfer medium 10, and is, of the layers constituting the transfer layer 14, positioned farthest from the base 11.

Dye is thermally transferred onto the receiving layer 13 of the intermediate transfer medium 10 to form an image.

Base 11

The base 11 is not particularly limited in terms of material and is, for example, an oriented or non-oriented plastic film of, for example, a polyester having high heat resistance such as polyethylene terephthalate or polyethylene naphthalate, polypropylene, polycarbonate, cellulose acetate, a polyethylene derivative, polyamide, or polymethylpentene. A composite film in which layers of two or more of these materials are stacked is also usable. The thickness of the base 11 can be appropriately selected in accordance with the material so as to provide appropriate strength, heat resistance, and the like, and is ordinarily 3 μm or more and 30 μm or less, preferably 4 μm or more and 15 μm or less.

Receiving Layer 13

The receiving layer 13 is not particularly limited in terms of material, and can be appropriately selected from publicly known receiving layers in the field of intermediate transfer media and used. Examples include polyolefins such as polypropylene, halogenated resins such as polyvinyl chloride and polyvinylidene chloride, vinyl resins such as polyvinyl acetate, vinyl chloride-vinyl acetate copolymers, and ethylene-vinyl acetate copolymers, polyesters such as polyethylene terephthalate and polybutylene terephthalate, copolymers of an olefin such as ethylene or propylene and another vinyl polymer, cellulose resins such as ionomer and cellulose diastase, and solvent-based resins such as polycarbonate, acrylic resin, polystyrene, and polyamide. The receiving layer 13 may contain, of these components, a single component alone or two or more components.

The receiving layer 13 may contain, together with such a resin component, a release agent. Examples of the release agent include solid waxes such as polyethylene wax, amide wax, and TEFLON (registered trademark) powder, fluorine- or phosphate-based surfactants, silicone oil, various modified silicone oils such as reactive silicone oil and curable silicone oil, and various silicone resins.

The receiving layer 13 has a thickness of, for example, 1 μm or more and 10 μm or less.

Protective Layer 12

The protective layer 12 protects, after transfer of the transfer layer 14 onto the transfer-receiving body, the image formed on the receiving layer 13. The protective layer 12 may be a stack of a plurality of layers.

For the protective layer, a resin that is excellent in scratch resistance, transparency, hardness, and the like can be appropriately used. Specific examples include polyester, vinyl chloride-vinyl acetate copolymers, polystyrene, acrylic resin, polyurethane, acrylurethane, polycarbonate, silicone-modified resins of these resins, and mixtures of these resins. Other examples include resins provided by irradiating acrylic monomers or the like with ionizing radiation to cause crosslinking curing. Specific examples of the acrylic monomers include ethylene glycol di(meth)acrylate, hexanediol di(meth)acrylate, trimethylolpropane tri(meth)acrylate, trimethylolpropane di(meth)acrylate, pentaerythritol tetra (meth)acrylate, dipentaerythritol hexa(meth)acrylate, ethylene glycol diglycidyl ether di(meth)acrylate, propylene glycol diglycidyl ether di(meth)acrylate, and sorbitol tetraglycidyl ether tetra(meth)acrylate. The substance cured using the ionizing radiation is not limited to the monomers, and their oligomers may be used. Furthermore, acrylic reactive polymers are also usable that are formed of polymers of the above-described substances or derivatives thereof and that are polyester acrylate-based, epoxy acrylate-based, urethane acrylate-based, or polyether acrylate-based polymers, for example. These may be used in the form of a mixture with another acrylic resin.

The protective layer is formed by, onto the base 11, applying and drying a coating liquid in which the above-described resin and an additive optionally added are dissolved or dispersed in a solvent. Examples of coating means include a gravure printing method, a screen printing method, and a reverse roll coating method using a gravure cylinder. The thickness of the protective layer increases in proportion to the durability. The thickness of the protective layer is, in a case where the protective layer contains an actinic-ray-curable resin, about 0.5 μm or more and about 7 μm or less or, in a case where the protective layer does not contain an actinic-ray-curable resin, about 0.5 μm or more and about 15 μm or less.

The configuration of the intermediate transfer medium 10 is not limited to that illustrated in FIG. 2. For example, on the other surface of the base 11, a back-surface layer (not shown) may be disposed. Between the base 11 and the protective layer 12, an optional layer such as a peeling layer (not shown) may be disposed.

The peeling layer is used in order to improve the transferability (peelability) of the transfer layer 14 and is positioned closest to the base 11 among the layers constituting the transfer layer 14. Examples of the component of the peeling layer include waxes, silicone wax, silicone resin, silicone-modified resin, fluororesin, fluorine-modified resin, polyvinyl alcohol, acrylic resin, thermally crosslinkable epoxy-amino resin, and thermally crosslinkable alkyd-amino resin. The peeling layer may contain, of these components, a single component alone or two or more components.

The peeling layer has a thickness of, for example, 0.5 μm or more and 5 μm or less.

Thermal Transfer Sheet

Figure 3:
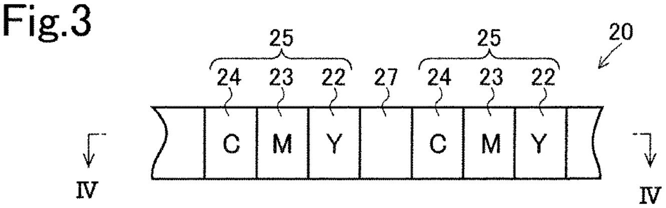
FIG. 3 is a plan view of a thermal transfer sheet.
Figure 4:
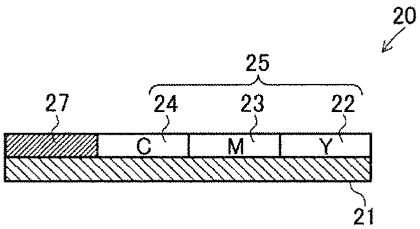
FIG. 4 is a sectional view taken along line IV-IV in FIG. 3.

Hereinafter, the thermal transfer sheet 20 used in the thermal transfer printer will be described. FIG. 3 is a plan view of the thermal transfer sheet 20. FIG. 4 is a sectional view taken along line IV-IV in FIG. 3. As illustrated in FIG. 3 and FIG. 4, the thermal transfer sheet 20 has a base 21, a dye layer 25 constituted by a yellow dye (Y) layer 22, a magenta dye (M) layer 23, and a cyan dye (C) layer 24 and a particle layer 27 that are disposed on the same surface of the base 21. The Y layer 22, the M layer 23, the C layer 24, and the particle layer 27 are sequentially and repeatedly disposed in any order.

Base 21

The base 21 is not particularly limited and is, for example, thin paper such as glassine paper, capacitor tissue paper, or paraffin paper, or a plastic oriented or non-oriented film of a polyester having high heat resistance such as polyethylene terephthalate, polyethylene naphthalate, polybutylene terephthalate, polyphenylene sulfide, polyether ketone, or polyether sulfone, polypropylene, polycarbonate, cellulose acetate, a polyethylene derivative, polyvinyl chloride, polyvinylidene chloride, polystyrene, polyamide, polyimide, polymethylpentene, or ionomer, for example. A composite film in which layers of two or more of these materials are stacked is also usable.

The base 21 has a thickness of, for example, 2 μm or more and 10 μm or less.

Dye Layer 25

The dye layer 25 contains a colorant and a binder resin. The colorant and the binder resin usable can be appropriately selected from publicly known ones in the field of sublimation thermal transfer sheets, and will not be described in detail.

Particle Layer 27

The particle layer 27 contains particles and a binder resin. The particles have an average particle size of, for example, 0.1 μm or more and 10 μm or less, preferably 2 μm or more and 5 μm or less, more preferably 2 μm or more and 3.5 μm or less. The average particle size herein is a median diameter (based on volume) measured in accordance with JIS Z 8825:2013, for example. The particles can be provided to have such an average particle size, to thereby effectively exert advantages of the present disclosure. Examples of the particles include spherical composite particles composed of melamine resin and silica, spherical particles formed from melamine resin and benzoguanamine resin serving as raw materials, and hydrate magnesium silicate particles.

Examples of the binder resin include polyolefins such as polyethylene and polypropylene, vinyl resins such as polyvinyl chloride, vinyl chloride-acrylic copolymers, vinyl chloride-vinyl acetate copolymers, and polyvinyl acetate, polyesters such as polyethylene terephthalate and polybutylene terephthalate, copolymers of an olefin such as ethylene or propylene and another vinyl monomer, acrylic resin, polyvinylidene chloride, ionomer, cellulose resin, polycarbonate, polystyrene, and polyamide. Particularly preferred are vinyl chloride-vinyl acetate copolymers and acrylic resin. Two or more of these materials may be contained.

The particle layer is formed by applying, onto the base 21, and drying a coating liquid prepared by dissolving or dispersing particles and optionally added another additive in a solvent. Examples of the coating means include a gravure printing method, a screen printing method, and a reverse roll coating method using a gravure cylinder. In order that upper portions of the particles are exposed, the particles preferably have an average particle size about 2 or more and about 5 or less times the thickness of the particle layer (regions other than the particles), more preferably 2 or more and 3.5 or less times the thickness from the viewpoint of the strength of holding the particles.

The configuration of the thermal transfer sheet 20 is not limited to the configuration illustrated in FIG. 3 and FIG. 4. For example, in addition to the dye layer 25 and the particle layer 27, another colorant layer such as a fusible layer containing a thermofusible ink may be sequentially disposed in any order. On a surface of the thermal transfer sheet 20 opposite from the surface having the dye layer 25 and the particle layer 27, a back-surface layer (not shown) may be disposed.

Configuration of Thermal Transfer Printer

As illustrated in FIG. 1, a supply unit 70 (first supply unit) of the thermal transfer printer is loaded with a roll formed by taking up the intermediate transfer medium 10 into the form of a ribbon. The supply unit 70 rotates the roll of the intermediate transfer medium 10 to convey the intermediate transfer medium 10 having a long strip form to the printing unit 50 and subsequently to the transfer unit 60.

The printing unit 50 includes a thermal head 53, a platen roll 54 disposed under the thermal head 53 and configured to drivingly rotate, and raising and lowering means (not shown) for enabling raising and lowering of the thermal head 53 relative to the platen roll 54. The intermediate transfer medium 10 supplied from the supply unit 70 is passed between the thermal head 53 and the platen roll 54.

In the printing unit 50, the thermal transfer sheet 20 from a supply roll 51 (second supply unit) is passed over a guide roll 55, between the thermal head 53 and the platen roll 54, and over a guide roll 56, and taken up by a take-up roll 52. Between the thermal head 53 and the platen roll 54, the dye layer 25 and the particle layer 27 of the thermal transfer sheet 20 are provided to face the receiving layer 13 of the intermediate transfer medium 10.

Figure 5:
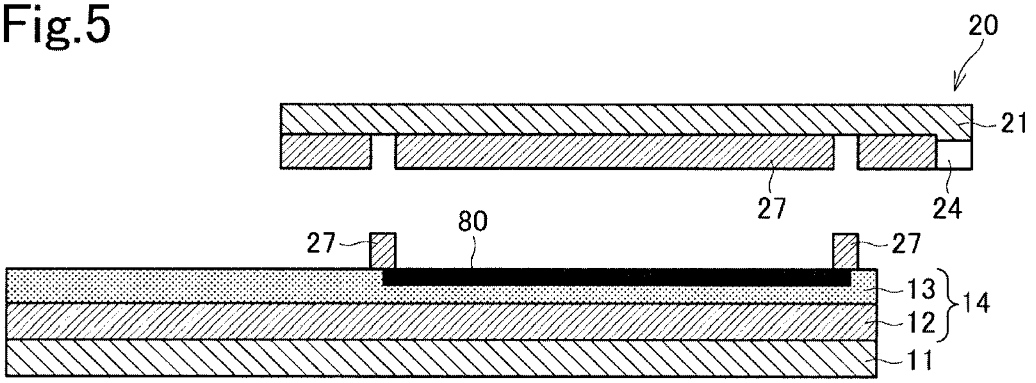
FIG. 5 is a step sectional view illustrating the thermal transfer method according to the embodiment.

The thermal head 53 heats, from the base-21 side of the thermal transfer sheet 20, the dye layer 25, to transfer the dye onto the receiving layer 13 of the intermediate transfer medium 10, to form an image 80 (refer to FIG. 5). The image 80 indicates the image formation region; this image formation region may have, as a whole (over the whole surface), the transferred dye, or may include a portion that does not have the transferred dye.

The thermal head 53, under direction of the control unit, heats, from the base-21 side of the thermal transfer sheet 20, the particle layer 27, to transfer the particle layer 27 onto the receiving layer 13. The transfer region of the particle layer 27 will be described later.

As illustrated in FIG. 1, the intermediate transfer medium 10 on which, in the printing unit 50, the image 80 has been formed on the receiving layer 13 and the particle layer 27 has been transferred onto the receiving layer 13, is conveyed over guide rolls 72 to the transfer unit 60.

The transfer unit 60 includes a heat roller 61 and a pressure roll 62 disposed under the heat roller 61. The transfer unit 60 transfers, onto a transfer-receiving body 40 supplied from a transfer-receiving body supply unit 42 (third supply unit), the transfer layer 14 of the intermediate transfer medium 10. The transfer-receiving body 40 is, for example, a card base formed of, as the base material, a synthetic resin such as polyvinyl chloride, polyester, polycarbonate, polyamide, polyimide, polycellulose diacetate, polycellulose triacetate, polystyrene, acrylic resin, polypropylene, or polyethylene.

The transfer-receiving body supply unit 42 includes, for example, a feeding unit that feeds, one by one, sheet-shaped bodies 40 in accordance with conveyance of the intermediate transfer medium 10, and a conveyer unit that conveys the fed bodies 40. In this embodiment, the case of using sheet-shaped bodies 40 is described; alternatively, the transfer-receiving body may be a long substrate taken up into a roll.

The bodies 40 on which the images have been formed are conveyed to an exit unit 44, and stacked one by one. The intermediate transfer medium 10 from which the transfer layers 14 have been transferred onto the bodies 40 is taken up by a take-up roll 71.

Hereinafter, a method of forming an image on the transfer-receiving body 40 to produce a printed product will be described with reference to FIG. 5 to FIG. 8. This method for producing a printed product includes an image formation step, a particle-layer transfer step, and a transfer-layer transfer step.

Image Formation Step

In the image formation step, first, the intermediate transfer medium 10 and the Y layer 22 of the thermal transfer sheet 20 are aligned with each other. Subsequently, the thermal head 53 is lowered toward the platen roll 54 such that the thermal head 53 comes into contact with the platen roll 54 with the thermal transfer sheet 20 and the intermediate transfer medium 10 therebetween. The platen roll 54 drivingly rotates, to convey downstream the thermal transfer sheet 20 and the intermediate transfer medium 10. During this, on the basis of the image data transmitted to the thermal head 53, the thermal head 53 selectively heats a region of the Y layer 22 of the thermal transfer sheet 20, to transfer the yellow dye from the thermal transfer sheet 20 onto the receiving layer 13.

After the transfer of yellow, the thermal head 53 is raised and separated from the platen roll 54. Subsequently, the intermediate transfer medium 10 and the M layer 23 of the thermal transfer sheet 20 are aligned with each other. In this case, the intermediate transfer medium 10 is conveyed upstream by a predetermined distance. As in the process of transferring the yellow dye onto the receiving layer 13, the M layer 23 and the C layer 24 are heated, to sequentially transfer the magenta dye and the cyan dye onto the receiving layer 13, to form the image 80 (refer to FIG. 5).

Particle-Layer Transfer Step

After the image 80 is formed, the thermal head 53 is raised and separated from the platen roll 54. Subsequently, the intermediate transfer medium 10 and the particle layer 27 of the thermal transfer sheet 20 are aligned with each other. The thermal head 53 is lowered toward the platen roll 54 such that the thermal head 53 comes into contact with the platen roll 54 with the thermal transfer sheet 20 and the intermediate transfer medium 10 therebetween. The platen roll 54 drivingly rotates, to convey downstream the thermal transfer sheet 20 and the intermediate transfer medium 10. During this, on the basis of the data transmitted from the control unit to the thermal head 53, the thermal head 53 selectively heats a region of the particle layer 27 of the thermal transfer sheet 20. As a result, as illustrated in FIG. 5, the particle layer 27 is transferred from the thermal transfer sheet 20 onto the transfer layer 14 (receiving layer 13).

Figure 6:
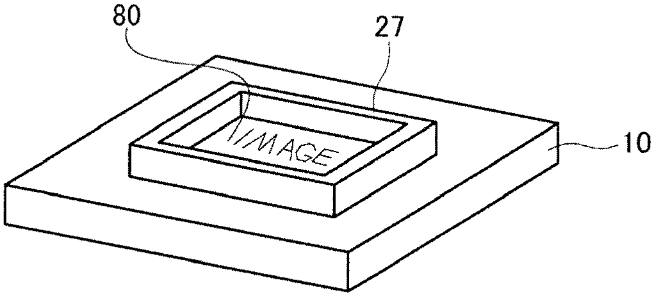
FIG. 6 is a schematic view of a transferred particle layer.

The particle layer 27 is transferred, of the transfer layer 14, along the peripheral area of the region to be transferred onto the transfer-receiving body 40. For example, when the image 80 formed on the receiving layer 13 is to be transferred onto the whole surface of the transfer-receiving body 40, as illustrated in FIG. 6, the particle layer 27 is transferred in the shape of a frame surrounding the image 80. A portion of or the whole of the particle layer 27 may overlap the outer periphery of the image 80. The width of the particle layer 27 is not particularly limited, but is, for example, about 1 mm or more and about 10 mm or less. The width of the particle layer transferred onto a card is preferably 1 mm or less in the case of consideration of effect on the print design. The control unit determines, on the basis of the shape of the image 80, the frame-shaped particle-layer-transfer region surrounding the image 80, and directs the thermal head 53.

Transfer-Layer Transfer Step

Figure 7:
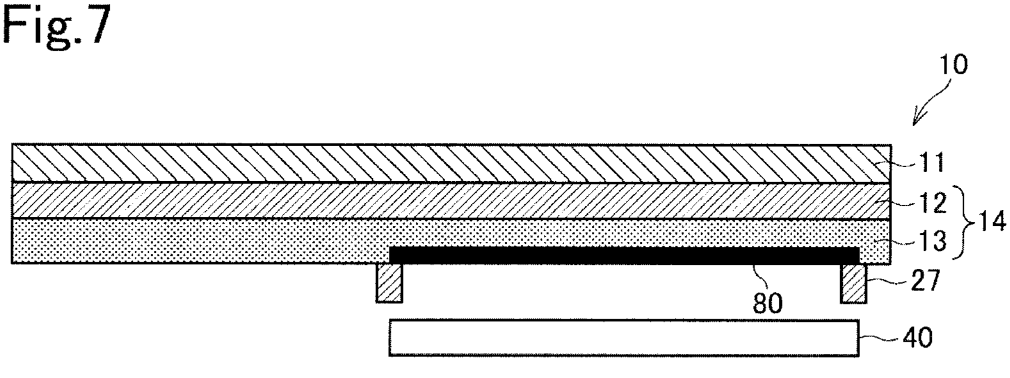
FIG. 7 is a step sectional view illustrating the thermal transfer method according to the embodiment.
Figure 8:
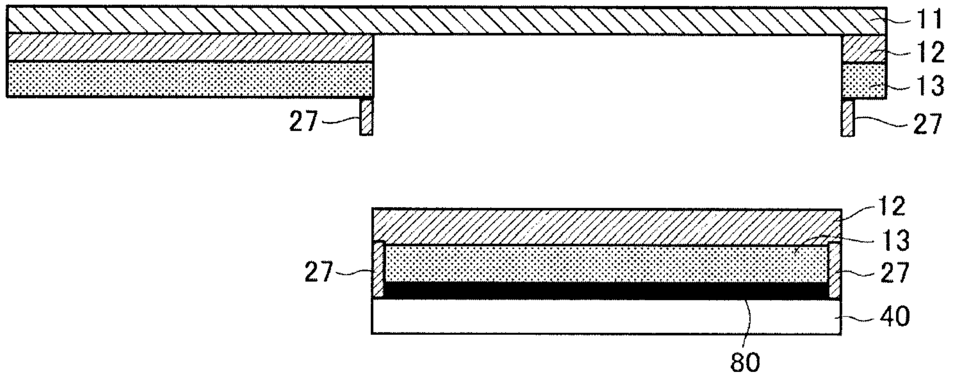
FIG. 8 is a step sectional view illustrating the thermal transfer method according to the embodiment.

As illustrated in FIG. 7 and FIG. 8, the transfer unit 60 heats, between the heat roller 61 and the pressure roll 62, the receiving layer-13 surface (having the image 80 formed and the particle layer 27 transferred) of the intermediate transfer medium 10 placed on the transfer-receiving body 40. At this time, the frame-shaped particle layer 27 as illustrated in FIG. 6 is strongly pressed by the edge portions of the transfer-receiving body 40, which causes cracking in the transfer layer 14 (protective layer 12). This cracking leads to breakage of the protective layer 12, so that, of the transfer layer 14, a region corresponding to the transfer-receiving body 40 is transferred onto the transfer-receiving body 40. This results in production of a printed product composed of the transfer-receiving body 40 having the image 80 formed.

Upon transfer of the transfer layer 14 onto the transfer-receiving body 40, at least a portion of the particle layer 27 may also be transferred onto the transfer-receiving body 40, so that, as illustrated in FIG. 8, the particle layer 27 may be disposed in (at least a portion of) the peripheral area of the transferred transfer layer 14 (receiving layer 13).

As described above, in this embodiment, the particle layer 27 is disposed in a portion (on the transfer layer 14) that comes into contact with the outer peripheral edge of the transfer-receiving body 40, so that, upon transfer of the transfer layer 14 onto the transfer-receiving body 40, concentrated load is applied to the particle layer 27, which leads to breakage of the protective layer 12. Thus, even when the intermediate transfer medium 10 employs a protective layer 12 having high breaking strength, the transfer layer 14 can be stably released with a low peel force, and transferred onto the transfer-receiving body 40 with high foil-separating property.

It may be considered that such a protective layer 12 is formed so as to contain, as a whole, particles in advance to thereby improve the transferability of the protective layer 12; however, in this case, particle conditions need to be selected in consideration of the glossiness or durability of the transfer-receiving body 40; in the case of increasing the thickness or strength of the protective layer, transfer conditions are not satisfied. In addition, in the case of forming the protective layer so as to contain, as a whole, particles, the printed product produced may crack due to the particles, and the protective layer may have degraded bending strength.

On the other hand, in the above-described embodiment, the particle layer 27 is disposed only in the outer peripheral edge portion of the transfer-receiving body 40, so that the particle conditions have wide range of choices and the protective layer can be formed so as to have high bending strength.

When a particle layer 27 is transferred so as to cover the whole image 80 from the thermal transfer sheet 20 onto the intermediate transfer medium 10, the printed product produced can have the image having lowered transparency. In the above-described embodiment, the particle layer 27 is disposed only in the outer peripheral edge portion, to thereby ensure transparency of the image.

Figure 9A:
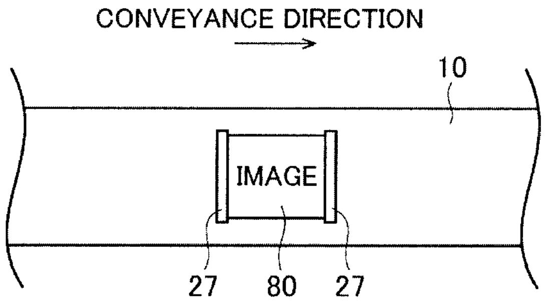
FIG. 9A and FIG. 9B are plan views of transferred particle layers.

The above-described embodiment describes an example in which the particle layer 27 is transferred in the shape of a frame surrounding the image 80 so as to correspond to the outer peripheral edge of the transfer-receiving body 40; however, the transfer region of the particle layer 27 is not limited to this. For example, as illustrated in FIG. 9A, of the substantially rectangular image 80, linear particle layers 27 may be transferred on the leading side and the trailing side in the conveyance direction of the intermediate transfer medium 10. This corresponds to a combination of opposing sides of the transfer-receiving body 40. In FIG. 9A, the particle layers 27 are transferred onto the whole linear parts on the leading side and the trailing side of the substantially rectangular image 80; alternatively, particle layers having a length of about 50% of the length of such a linear part may be transferred onto the central portions of the linear parts in order to cause breakage of the protective layer.

Figure 9B:
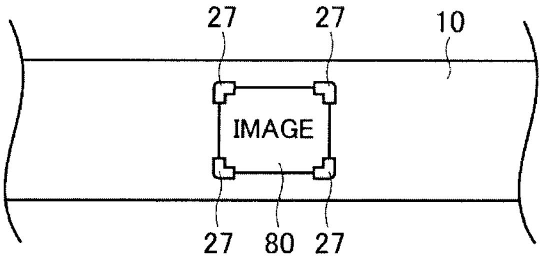

Alternatively, as illustrated in FIG. 9B, L-shaped particle layers 27 may be transferred to the four corners of the substantially rectangular image 80. This corresponds to the four corners of the outer peripheral edge of the rectangular (including substantially rectangular) transfer-receiving body 40.

The above-described embodiment describes the intermediate transfer medium in which the transfer layer includes the receiving layer; however, the same configuration is also applicable to a transfer foil in which the transfer layer does not include a receiving layer. The transfer layer has a monolayer structure or a multilayer structure of a plurality of layers; of the transfer layer, in at least a portion of the peripheral area of the transfer region to be transferred onto a transfer-receiving body, in other words, in an area corresponding to at least a portion of the outer peripheral edge of the transfer-receiving body, a particle layer is disposed. The transfer foil is, for example, a protective-layer transfer sheet including a transfer layer including a protective layer disposed so as to be releasable from the base. When the transfer layer is transferred from the transfer foil to the transfer-receiving body, the transfer foil is heated.

Prior to transfer of the transfer layer onto the transfer-receiving body, a portion of the transfer layer may be removed. The method of removing a portion of the transfer layer may be the following method: a thermal transfer sheet including, on one of the surfaces of the base, a fusible layer and a peel-off layer is used, and, at a stage prior to transfer of the transfer layer of the intermediate transfer medium onto the transfer-receiving body, a region (not to be transferred onto the transfer-receiving body) of the transfer layer is removed using the peel-off layer (for example, refer to JP2017-154435A).

In this method, onto the "removal region" of the transfer layer of the intermediate transfer medium, the fusible layer is transferred from the thermal transfer sheet. The fusible layer is, for example, a thermofusible ink. Subsequently, the intermediate transfer medium and the peel-off layer of the thermal transfer sheet are aligned with each other and the peel-off layer is heated. The fusible layer having been transferred onto the removal region of the transfer layer of the intermediate transfer medium is thermally bonded to the peel-off layer of the thermal transfer sheet, so that the removal region of the transfer layer is removed together with the fusible layer.

The timing at which the particle layer is transferred onto the intermediate transfer medium may be before, using the peel-off layer, removal of the predetermined region of the transfer layer or after the removal of the predetermined region of the transfer layer. For example, of the transfer layer of the intermediate transfer medium, onto predetermined removal regions corresponding to an IC chip region, a magnetic stripe region, a transmitting and receiving antenna region, a signature region, and the like, the fusible layer is transferred. Subsequently, the particle layer is transferred so as to surround such fusible layers. Subsequently, the peel-off layer of the thermal transfer sheet is used to remove the fusible layers on the intermediate transfer medium together with the removal regions of the transfer layer.

Alternatively, of the transfer layer of the intermediate transfer medium, onto the predetermined removal regions, the particle layer may be transferred and the peel-off layer of the thermal transfer sheet and the particle layer on the transfer layer may be thermally bonded together, to remove the removal regions of the transfer layer together with the particle layer. In this case, the printed product produced by transferring the transfer layer from the intermediate transfer medium onto the transfer-receiving body does not include the particle layer.

Figure 10:
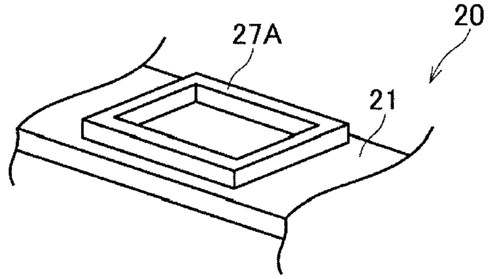
FIG. 10 is a perspective view of a thermal transfer sheet.

In the example illustrated in FIG. 6, the particle layer 27 of the thermal transfer sheet 20 is selectively heated, to transfer the particle layer 27 in the shape of a frame surrounding the image 80; alternatively, as illustrated in FIG. 10, a frame-shaped particle layer 27A may be disposed on the base 21 of the thermal transfer sheet 20. The region including the particle layer 27A in the thermal transfer sheet 20 is heated, to transfer the frame-shaped particle layer 27A onto the intermediate transfer medium 10.

The above-described embodiment describes the method of transferring the particle layer 27 from the thermal transfer sheet 20 onto the intermediate transfer medium 10; alternatively, a frame-shaped particle layer may be disposed between layers of the intermediate transfer medium 10. In this case, the particle layer 27 in the thermal transfer sheet 20 can be omitted.

Figure 11A:
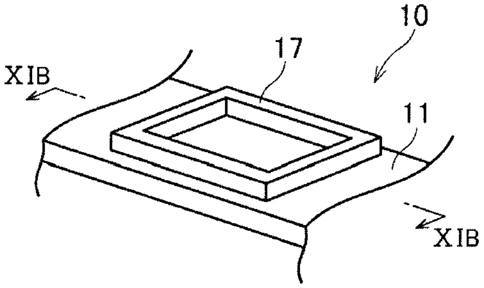
FIG. 11A is a perspective view of an intermediate transfer medium.
Figure 11B:
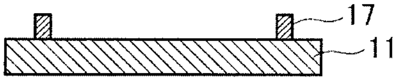
FIG. 11B is a sectional view taken along line XIB-XIB in FIG. 11A.

For example, as illustrated in FIG. 11A and FIG. 11B, onto the base 11 of the intermediate transfer medium 10, a particle-layer-forming coating liquid is applied in a frame shape and dried, to form a frame-shaped particle layer 17. The particle layer 17 can be formed of the same material as in the particle layer 27.

Figure 12:
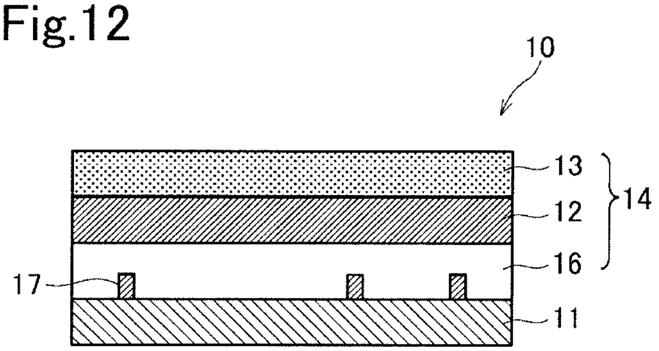
FIG. 12 is a sectional view of an intermediate transfer medium.

Subsequently, as illustrated in FIG. 12, a peeling layer 16 is formed on the base 11 so as to cover the particle layer 17. Subsequently, a protective layer 12 is formed on the peeling layer 16, and a receiving layer 13 is formed on the protective layer 12. An image is formed on the receiving layer 13 so as to correspond to the region surrounded by the frame-shaped particle layer 17.

The intermediate transfer medium 10 illustrated in FIG. 12 has different layer configurations between the region including the particle layer 17 and the region not including the particle layer 17, and hence has difference in rigidity. During transfer of, onto the transfer-receiving body 40, the transfer layer 14 (the protective layer 12, the receiving layer 13, and the peeling layer 16), concentrated load is applied to the positions having different rigidity, in other words, the area where the particle layer 17 is disposed, which leads to breakage of the protective layer 12. Thus, the transfer layer 14 is transferred onto the transfer-receiving body 40 with high foil-separating property.

The position of the particle layer 17 is not limited to a position between the base 11 and the peeling layer 16, and may be a position between desired layers of the transfer layer 14, such as between the peeling layer 16 and the protective layer 12. Alternatively, the particle layer 17 may be disposed on the receiving layer 13; however, in consideration of the colorant transferability onto the receiving layer 13, it is preferably disposed between layers of the transfer layer 14 or between the base 11 and the transfer layer 14. When the particle layer 17 is disposed between the base 11 and the transfer layer 14 (peeling layer 16), during transfer of the transfer layer 14 onto the transfer-receiving body 40, the particle layer 17 may be transferred together with the transfer layer 14 onto the transfer-receiving body 40, or may be left on the base 11.

Similarly, the transfer foil in which the transfer layer does not include the receiving layer such as a protective-layer transfer sheet may also have the configuration in which a frame-shaped particle layer is disposed between desired layers. The particle layer may be formed so as to contain an infrared-absorbing material or a fluorescent material, and a sensor that emits infrared rays or ultraviolet rays may be disposed in the thermal transfer printer so as to detect the position of the particle layer.

The shape of the particle layer disposed between layers of the intermediate transfer medium or the protective-layer transfer sheet is not limited to the frame shape; as with the particle layers illustrated in FIG. 9A and FIG. 9B, a plurality of particle layers that have a linear shape or an L-shape may be disposed.

In the methods in which, as illustrated in FIG. 10, the frame-shaped particle layer 27A is disposed in advance on the base 21 of the thermal transfer sheet 20, or, as illustrated in FIG. 11A and FIG. 11B, the frame-shaped particle layer 17 is disposed in advance on the base 11 of the intermediate transfer medium 10, images need to be formed in accordance with the frame-shaped particle layers 27A and 17. On the other hand, in the method in which, as illustrated in FIG. 5 and FIG. 6, the particle layer 27 is transferred onto the transfer layer 14 after formation of the image 80, the particle layer 27 can be transferred in a desired shape in accordance with the size or shape of the image 80, which is more preferable than the methods of disposing the particle layer 27A or 17 in advance.

In the above-described embodiment, the particle layers 27, 27A, and 17 are not limited to those containing a binder resin, and may be layers formed by applying particles dispersed in a solvent so as to have a desired shape such as a frame shape (particle-disposed region).

A thermal transfer printer according to the present invention includes a first supply unit configured to supply an intermediate transfer medium in which, on one of surfaces of a first base, a transfer layer including a receiving layer is disposed; a second supply unit configured to supply a thermal transfer sheet in which, on one of surfaces of a second base, a colorant layer and a particle layer are disposed; a printing unit configured to heat the thermal transfer sheet, to transfer a colorant from the colorant layer to the receiving layer to form an image, and to transfer the particle layer onto the receiving layer; a third supply unit configured to supply a transfer-receiving body; and a transfer unit configured to place the intermediate transfer medium and the transfer-receiving body on top of each other such that the transfer-receiving body faces the particle layer on the receiving layer, and to heat the intermediate transfer medium to transfer the transfer layer onto the transfer-receiving body such that the particle layer is placed in at least a portion of a peripheral area of the transfer-receiving body, to produce a printed product.

In the thermal transfer printer, the printing unit may be configured to transfer the particle layer only onto a peripheral area of the image formed on the receiving layer. The printing unit may be configured to transfer the particle layer onto the receiving layer so as to surround the image. The transfer-receiving body and the image may be rectangular, and the printing unit may be configured to transfer the particle layer to four corners of the image.

A method for producing a printed product according to the present invention includes a step of supplying an intermediate transfer medium in which, on one of surfaces of a base, a transfer layer including a receiving layer is disposed; a step of heating a thermal transfer sheet in which a colorant layer and a particle layer are disposed, to transfer, onto the receiving layer, a colorant of the colorant layer to form an image; a step of heating the thermal transfer sheet to transfer, onto the receiving layer having the image formed, the particle layer; and a step of placing the intermediate transfer medium and a transfer-receiving body on top of each other such that the transfer-receiving body faces the particle layer on the receiving layer, and heating the intermediate transfer medium to transfer the transfer layer onto the transfer-receiving body such that the particle layer is placed in at least a portion of a peripheral area of the transfer-receiving body, to produce a printed product.

A printed product according to the present invention includes a base; a receiving layer disposed on the base and having a printed image; a protective layer disposed on the receiving layer; and a particle layer disposed in at least a portion of a peripheral area of an image region of the receiving layer so as to be in contact with the base and the receiving layer.

In the printed product, the particle layer may be disposed only in the peripheral area of the image region of the receiving layer.

A method for producing a printed product according to the present invention includes a step of supplying a transfer foil in which, on one of surfaces of a base, a transfer layer is disposed; a step of heating a thermal transfer sheet in which a particle layer is disposed, to transfer the particle layer onto a predetermined region on the transfer layer; and a step of placing the transfer foil and a transfer-receiving body on top of each other such that the transfer-receiving body faces the particle layer on the transfer layer, and heating the transfer foil to transfer the transfer layer onto the transfer-receiving body such that the particle layer is placed in at least a portion of a peripheral area of the transfer-receiving body, to produce a printed product.

In a combination of an intermediate transfer medium and a thermal transfer sheet according to the present invention, the intermediate transfer medium includes a first base and a transfer layer disposed on one of surfaces of the first base, and the thermal transfer sheet includes a second base and a particle layer disposed on one of surfaces of the second base.

An intermediate transfer medium according to the present invention includes a base; a transfer layer disposed on one of surfaces of the base and including a plurality of layers; and a particle layer disposed on the transfer layer, between layers of the transfer layer, or between the base and the transfer layer.

In a thermal transfer sheet according to the present invention, on one of surfaces of a base, a colorant layer and a frame-shaped particle layer are sequentially disposed in any order.

A method for producing a printed product according to the present invention includes a step of supplying an intermediate transfer medium in which, on one of surfaces of a base, a transfer layer including a receiving layer is disposed; a step of heating a thermal transfer sheet in which a colorant layer, a particle layer, and a peel-off layer are disposed, to transfer, onto the receiving layer, a colorant of the colorant layer, to form an image; a step of, after formation of the image, heating the thermal transfer sheet to transfer, onto a predetermined removal region of the receiving layer, the particle layer; a step of placing the peel-off layer of the thermal transfer sheet and the particle layer on the receiving layer on top of each other, and heating the thermal transfer sheet to remove the transfer layer in the removal region together with the particle layer from the intermediate transfer medium; and a step of placing, on top of each other, a transfer-receiving body and the intermediate transfer medium from which the transfer layer in the removal region has been removed, and heating the intermediate transfer medium to transfer the transfer layer onto the transfer-receiving body, to produce a printed product.

EXAMPLES

Hereinafter, the present invention will be more specifically described with reference to Examples according to the present invention and Comparative Examples. Note that "parts" in the following descriptions is based on mass unless otherwise specified.

Production of Intermediate Transfer Medium A

As a base, a PET film having a thickness of 16 μm was used; onto this base, a peeling-layer-forming coating liquid having the following composition was applied such that the dry thickness would become 0.5 μm and dried, to form a peeling layer. Subsequently, onto the peeling layer, a protective-layer-forming coating liquid having the following composition was applied such that the dry thickness would become 7 μm and dried, to form a protective layer. Furthermore, onto the protective layer, a receiving-layer-forming coating liquid having the following composition was applied such that the dry thickness would become 1 μm and dried to form a receiving layer, to thereby provide an intermediate transfer medium A in which, on the base, the peeling layer, the protective layer, and the receiving layer were stacked in this order. Note that, in the intermediate transfer medium A, the peeling layer, the protective layer, and the receiving layer constitute a transfer layer.

Peeling-Layer-Forming Coating Liquid

Acrylic resin (DIANAL (registered trademark) BR-87 Mitsubishi Chemical Corporation)
  20 parts
Polyester (VYLON (registered trademark) 600, TOYOBO CO., LTD.) 1 part
Methyl ethyl ketone (MEK)
  79 parts Protective-Layer-Forming Coating Liquid (Meth)acrylic polyol resin
  100 parts
  (manufactured by Taisei Fine Chemical Co., Ltd., 6KW-700, solid content: 36.5%, Tg: 102° C., Mw: 55000, hydroxyl value: 30.1)
Isocyanate compound
  3.6 parts
  (manufactured by Mitsui Chemicals, Inc., TAKENATE (registered trademark) D110N, solid content: 75%)
Methyl ethyl ketone
  92 parts Receiving-Layer-Forming Coating Liquid Vinyl chloride-vinyl acetate copolymer
  20 parts
  (SOLBIN (registered trademark) CNL, Nissin Chemical Industry Co., Ltd.)
Epoxy-modified silicone oil (KP-1800U, Shin-Etsu Chemical Co., Ltd.)
  1 part
Methyl ethyl ketone
  200 parts
Toluene
  200 parts Production of Intermediate Transfer Medium B As a base, a PET (polyethylene terephthalate) film having a thickness of 25 μm was used; onto one of the surfaces of this base, a peeling-layer-forming coating liquid having the following composition was applied and dried, to form a peeling layer having a thickness of 0.5 μm. Subsequently, onto the peeling layer, a protective-layer-forming coating liquid having the following composition was applied and dried, and subsequently irradiated with ultraviolet rays using an UV exposure system (Fusion UV, F600V, LH10 lamp, H bulb, reflex mirror: cold type), to form a protective layer having a thickness of 4.5 μm. Subsequently, onto the protective layer, a primer-layer-forming coating liquid having the following composition was applied and dried, to form a primer layer having a thickness of 0.8 μm. Subsequently, onto the primer layer, a receiving-layer-forming coating liquid having the following composition was applied and dried, to form a receiving layer having a thickness of 0.6 μm, to provide an intermediate transfer medium B in which, on one of the surfaces of the base, the transfer layer was disposed. Note that, the transfer layer in the intermediate transfer medium B has a multilayer structure in which, from the base side, the peeling layer, the protective layer, the primer layer, and the receiving layer are stacked in this order.

Peeling-Layer-Forming Coating Liquid

Acrylic resin (DIANAL (registered trademark) BR-87, Mitsubishi Chemical Corporation)
  95 parts
Polyester (VYLON (registered trademark) 200, TOYOBO CO., LTD.)
  5 parts
Toluene
  200 parts
Methyl ethyl ketone
  200 parts Protective-Layer-Forming Coating Liquid Multifunctional acrylate (NK ESTER A-9300, Shin Nakamura Chemical Co., Ltd.) 18 parts
Urethane acrylate (NK OLIGOMER EA1020, Shin Nakamura Chemical Co., Ltd.) 18 parts
Urethane acrylate (NK ESTER U-15HA, Shin Nakamura Chemical Co., Ltd.) 10 parts
Reactive binder (containing unsaturated group)
  4 parts
  (NK Polymer C24T, Shin Nakamura Chemical Co., Ltd.)
Filler (volume-average particle size: 12 nm)
  34 parts
  (MEK-AC2140Z, Nissan Chemical Industries, Ltd.)
Surfactant (acrylic surfactant) (LF-1984, Kusumoto Chemicals, Ltd.)
  1 part
Photopolymerization initiator (IRGACURE (registered trademark) 184, BASF Japan Ltd.)
  5 parts
Toluene
  100 parts
Methyl ethyl ketone
  100 parts Primer-Layer-Forming Coating Liquid Polyester (VYLON (registered trademark) 200, TOYOBO CO., LTD.) 3.3 parts
Vinyl chloride-vinyl acetate copolymer
  2.7 parts
  (SOLBIN (registered trademark) CNL, Nissin Chemical Industry Co., Ltd.)
Polyisocyanate curing agent
  1.5 parts
  (TAKENATE (registered trademark) D110N, Mitsui Chemicals, Inc.)

Toluene
3.3 parts
Methyl ethyl ketone
6.7 parts

Receiving-Layer-Forming Coating Liquid

Vinyl chloride-vinyl acetate copolymer
20 parts
(SOLBIN (registered trademark) CNL, Nissin Chemical Industry Co., Ltd.)
Epoxy-modified silicone oil (KP-1800U, Shin-Etsu Chemical Co., Ltd.)
1 part
Methyl ethyl ketone
200 parts
Toluene
200 parts Example 1

Production of Thermal Transfer Sheet

As a sheet base, a polyethylene terephthalate film (thickness: 4.5 μm) was used; onto one of its surfaces, a particle-layer-forming coating liquid having the following composition was applied such that the dry thickness would become 1 μm and dried to form a particle layer, to produce a thermal transfer sheet.

Particle-Layer-Forming Coating Liquid

Vinyl chloride-vinyl acetate copolymer
7 parts
(SOLBIN (registered trademark) CNL, Nissin Chemical Industry Co., Ltd.)
Talc (amorphous)
3 parts
(MICRO ACE (registered trademark) P-3, average particle size: 5.0 μm, NIPPON TALC Co., Ltd.)
Methyl ethyl ketone
40 parts Example 2

In Example 2, a thermal transfer sheet was produced as in Example 1 except that the particle-layer-forming coating liquid was changed to have the following composition.

Particle-Layer-Forming Coating Liquid

Acrylic resin (DIANAL (registered trademark) BR-80, Mitsubishi Chemical Corporation)
7 parts
Talc (amorphous)
3 parts
(MICRO ACE (registered trademark) P-3, average particle size: 5.0 μm, NIPPON TALC Co., Ltd.)
Methyl ethyl ketone
40 parts Example 3

In Example 3, a thermal transfer sheet was produced as in Example 1 except that the particle-layer-forming coating liquid was changed to have the following composition.

Particle-Layer-Forming Coating Liquid

Vinyl chloride-vinyl acetate copolymer
5 parts
(SOLBIN (registered trademark) CNL, Nissin Chemical Industry Co., Ltd.)
Talc (amorphous)
5 parts
(MICRO ACE (registered trademark) P-3, average particle size: 5.0 μm, NIPPON TALC Co., Ltd.)
Methyl ethyl ketone
40 parts Example 4

In Example 4, a thermal transfer sheet was produced as in Example 1 except that the particle-layer-forming coating liquid was changed to have the following composition.

Particle-Layer-Forming Coating Liquid

Vinyl chloride-vinyl acetate copolymer
9 parts
(SOLBIN (registered trademark) CNL, Nissin Chemical Industry Co., Ltd.)
Talc (amorphous)
1 part
(MICRO ACE (registered trademark) P-3, average particle size: 5.0 μm, NIPPON TALC Co., Ltd.)
Methyl ethyl ketone
40 parts Example 5

In Example 5, a thermal transfer sheet was produced as in Example 1 except that the particle-layer-forming coating liquid was changed to have the following composition.

Particle-Layer-Forming Coating Liquid

Vinyl chloride-vinyl acetate copolymer
7 parts
(SOLBIN (registered trademark) CNL, Nissin Chemical Industry Co., Ltd.)
Composite spherical particles composed of melamine resin and silica
3 parts
(OPTBEADS (registered trademark) 2000M, average particle size: 2.0 μm, Nissan Chemical Industries, Ltd.)
Methyl ethyl ketone
40 parts Example 6

In Example 6, a thermal transfer sheet was produced as in Example 1 except that a particle layer was formed by applying a particle-layer-forming material having the following composition onto the base.

Particle-Layer-Forming Material

Vinyl chloride-vinyl acetate copolymer
7 parts
(SOLBIN (registered trademark) CNL, Nissin Chemical Industry Co., Ltd.)

Composite spherical particles composed of melamine resin and silica
3 parts
(OPTBEADS (registered trademark) 3500M, average particle size: 3.5 μm, Nissan Chemical Industries, Ltd.)

Example 7

In Example 7, a thermal transfer sheet was produced as in Example 6 except that the particle-layer-forming material was changed to have the following composition.

Particle-Layer-Forming Material

Vinyl chloride-vinyl acetate copolymer
7 parts
(SOLBIN (registered trademark) CNL, Nissin Chemical Industry Co., Ltd.)
Thermosetting resin spherical particles formed of melamine resin and benzoguanamine resin
3 parts
(EPOSTAR (registered trademark) MS, average particle size: 2 μm, NIPPON SHOKUBAI CO., LTD.)

Example 8

In Example 8, a thermal transfer sheet was produced as in Example 6 except that the particle-layer-forming material was changed to have the following composition.

Particle-Layer-Forming Material

Vinyl chloride-vinyl acetate copolymer
3 parts
(SOLBIN (registered trademark) CNL, Nissin Chemical Industry Co., Ltd.)
Acrylic particles (MP-1451, average particle size: 0.15 μm, Soken Chemical & Engineering Co., Ltd.)
3 parts Evaluation of Transferability A test printer described below was used to form 128/256-level gray images on the receiving layers of the intermediate transfer media A and B produced above, using a genuine ink ribbon for a dye-sublimation re-transfer printer CX-7000 (G-Printec, Inc.). The image formation regions were set to have dimensions of 88 mm×56 mm.

The test printer was used to transfer, onto the receiving layers (having the images formed) of the intermediate transfer media A and B, particle layers from the thermal transfer sheets of Examples. Such a particle layer was transferred in the shape of a frame having a width of 2.5 mm so as to surround, within the image formation region, the outer peripheral portion of the card.

The intermediate transfer media A and B having the transferred particle layers and cards serving as bodies were combined together, and the test printer was used to apply energy to the whole regions overlapping the gray images in the intermediate transfer media, to transfer the transfer layers of the intermediate transfer media under application of energy, onto the cards, to provide printed products. Note that the transfer layers were transferred using a laminator (LPD3224, HISAGO Co., Ltd.) under conditions set at a lamination temperature of 160° C. and a lamination speed of 530 mm/min. The cards employed were polyvinyl chloride cards having dimensions in accordance with JIS X 6301 standards ((length) about 54 mm×(width) about 86 mm×(thickness) about 0.8 mm, Dai Nippon Printing Co., Ltd.).

As Comparative Example 1, the transfer layer of each intermediate transfer medium onto which the particle layer was not transferred, was transferred onto a card.

Test Printer

Thermal head; KEE-57-12GAN2-STA (manufactured by KYOCERA Corporation)
Average resistance of heater element; 3303 (Ω)
Dot density in main-scanning direction; 300 dpi
Dot density in sub-scanning direction; 300 dpi
Printing voltage; 18 (V)
Scanning line time; 3.0 (msec.)
Printing starting temperature; 35(° C.)
Pulse Duty ratio; 85%

For the obtained printed products, the transferability of the transfer layers was evaluated on the basis of the following grades. The evaluation results are described in Table 1.

Evaluation Grades

A: The transfer was achieved under application of a low (pressure) or more, and no tailing occurred.
B: The transfer was achieved under application of a medium (pressure) or more, and no tailing occurred.
C: The transfer was achieved under application of a high (pressure) or more, and no tailing occurred.
NG: Tailing occurred.

TABLE 1

| | Example 1 | Example 2 | Example 3 | Example 4 | Example 5 | Example 6 | Example 7 | Example 8 | Comparative Example 1 |
|---|---|---|---|---|---|---|---|---|---|
| Intermediate Transfer Media A | B | B | B | A | A | A | A | C | N G |
| Intermediate Transfer Media B | B | B | B | B | A | A | A | C | N G |

The present invention has been described so far in detail with reference to the specific embodiments; however, various changes can be made without departing from the spirit and scope of the present invention, which is apparent to those skilled in the art.

This application is based on Japanese Patent Application No. 2019-102841, filed May 31, 2019, and the content of which is incorporated by reference herein in its entirety.

REFERENCE SIGNS LIST

10 intermediate transfer medium
11 base
12 protective layer

13 receiving layer
14 transfer layer
20 thermal transfer sheet
21 base
22 yellow dye layer
23 magenta dye layer
24 cyan dye layer
25 dye layer
27 particle layer
40 transfer-receiving body
50 printing unit
60 transfer unit
80 image

The invention claimed is:

1. A thermal transfer printer comprising:

a first supply unit configured to supply an intermediate transfer medium in which, on one of surfaces of a first base, a transfer layer including a receiving layer is disposed;

a second supply unit configured to supply a thermal transfer sheet in which, on one of surfaces of a second base, a colorant layer and a particle layer are disposed;

a printing unit configured to heat the thermal transfer sheet, to transfer a colorant from the colorant layer to the receiving layer to form an image, and to transfer the particle layer onto the receiving layer;

a third supply unit configured to supply a transfer-receiving body; and a transfer unit configured to place the intermediate transfer medium and the transfer-receiving body on top of each other such that the transfer-receiving body faces the particle layer on the receiving layer, and to heat the intermediate transfer medium to transfer the transfer layer onto the transfer-receiving body such that the particle layer is placed in at least a portion of a peripheral area of the transfer-receiving body, to produce a printed product, wherein the printing unit selectively heats a region of the particle layer of the thermal transfer sheet to transfer the particle layer onto at least part of a peripheral area of the receiving layer to be transferred onto the transfer-receiving body, and wherein the transfer unit does not transfer the particle layer from the intermediate transfer medium to an inside of the peripheral area of the transfer-receiving body.

2. The thermal transfer printer according to claim 1, wherein the printing unit is configured to transfer the particle layer only onto a peripheral area of the image formed on the receiving layer.

3. The thermal transfer printer according to claim 1, wherein the printing unit is configured to transfer the particle layer onto the receiving layer so as to surround the image.

4. The thermal transfer printer according to claim 1, wherein the transfer-receiving body and the image are rectangular, and the printing unit is configured to transfer the particle layer to four corners of the image.

* * * * *